United States Patent [19]

Burnsweig

[11] 3,843,930

[45] Oct. 22, 1974

[54] TIME DELAY CONTROLLER CIRCUIT FOR REDUCING TIME JITTER BETWEEN SIGNAL GROUPS

[75] Inventor: Joseph Burnsweig, Los Angeles, Calif.

[73] Assignee: Hughes Aircraft Company, Culver City, Calif.

[22] Filed: Aug. 20, 1973

[21] Appl. No.: 389,755

Related U.S. Application Data

[62] Division of Ser. No. 231,192, March 2, 1972, Pat. No. 3,771,062.

[52] U.S. Cl. .................... 328/155, 328/55, 328/72, 179/15 BS, 178/69.5 F, 178/69.5 R

[51] Int. Cl. .......................................... H03b 3/04

[58] Field of Search ...................... 328/155, 55, 72; 178/69.5 R, 69.5 F, 69.5 TV; 179/15 BS

[56] References Cited

UNITED STATES PATENTS

| | | | |
|---|---|---|---|
| 3,057,959 | 10/1962 | Rowe | 178/69.5 R |
| 3,172,949 | 3/1965 | Okazaki et al. | 178/69.5 F |
| 3,202,769 | 8/1965 | Coleman | 178/69.5 TV |
| 3,312,903 | 4/1967 | Webb | 328/155 |
| 3,409,736 | 11/1968 | Hurst et al. | 178/65.5 F |
| 3,504,125 | 3/1970 | Inose et al. | 179/15 BS |

*Primary Examiner*—John S. Heyman
*Attorney, Agent, or Firm*—W. H. MacAllister; Lawrence V. Link, Jr.

[57] ABSTRACT

A time delay controller circuit wherein a time delay device, which comprises two dispersive delay lines interconnected to provide electronically variable "flat" time delay, is mechanized in a feedback control loop arrangement so as to provide a reduction in time jitter between successive signal groups. Means are provided for enabling the controller's output circuit only if the sensed time jitter is within the compensation range of the controller and for applying a dynamic time jitter correction.

7 Claims, 12 Drawing Figures

TIME DELAY CONTROLLER CIRCUIT FOR REDUCING TIME JITTER BETWEEN SIGNAL GROUPS

This is a division, of application Ser. No. 231,192, filed Mar. 2, 1972 now U.S. Pat. No. 3,771,062.

BACKGROUND OF THE INVENTION

This invention relates generally to time delay controller circuits and more particularly to such circuits adapted for reducing time jitter between successive signal groups.

In many applications such as certain video tape systems, for example, time jitter introduced by signal processing must be reduced to obtain acceptable output signal quality. Prior art time delay controller circuits have generally been functionally too restrictive or economically unacceptable for use as time base correction circuits for these video tape systems and other similar signal processing applications. Also, in the prior art controller circuits the electronically controllable time delay techniques have generally employed low bandwidth video delay lines using inductors and varactors; bridge tee type intermediate frequency phase modulators with varactors; intermediate frequency glass delay lines; or integrated metal oxide silicon (MOS) and bipolar analog lines using "bucket brigade capacitors." These prior art time delay techniques have severely limited the controllers as to the magnitude of their time delay control range, the degree of linearity, the operating frequency range and/or the bandwidth.

SUMMARY OF THE INVENTION

It is therefore a primary object of the subject invention to provide a cost effective time delay controller useful for reducing time jitter between successive signal groups — such as the output signals from multiple read head video tape playback systems, for example.

Briefly, according to one embodiment of the subject invention, a time delay controller circuit is provided wherein an electronically variable time delay device is mechanized in a feedback control loop arrangement so as to provide a reduction in time jitter between successive signal groups. Means are provided for enabling the controller's output circuit only if the sense time delay jitter is within the compensation range of the controller and for applying a dynamic time jitter correction. The controller's electronically variable time delay is implemented by first and second dispersive delay lines intercoupled to provide "flat" delay of signals processed therethrough; with the value of the time delay being selectable by means for controlling the carrier frequency of the signal. As used herein, the phrase "flat time delay" implies phase shift which is a linear function of frequency.

BRIEF DESCRIPTION OF THE DRAWINGS

The novel features of this invention as well as the invention itself will be better understood from the accompanying description taken in connection with the accompanying drawings, in which like reference characters refer to like parts and in which.

DESCRIPTION OF THE PREFERRED EMBODIMENTS

Figure 7:
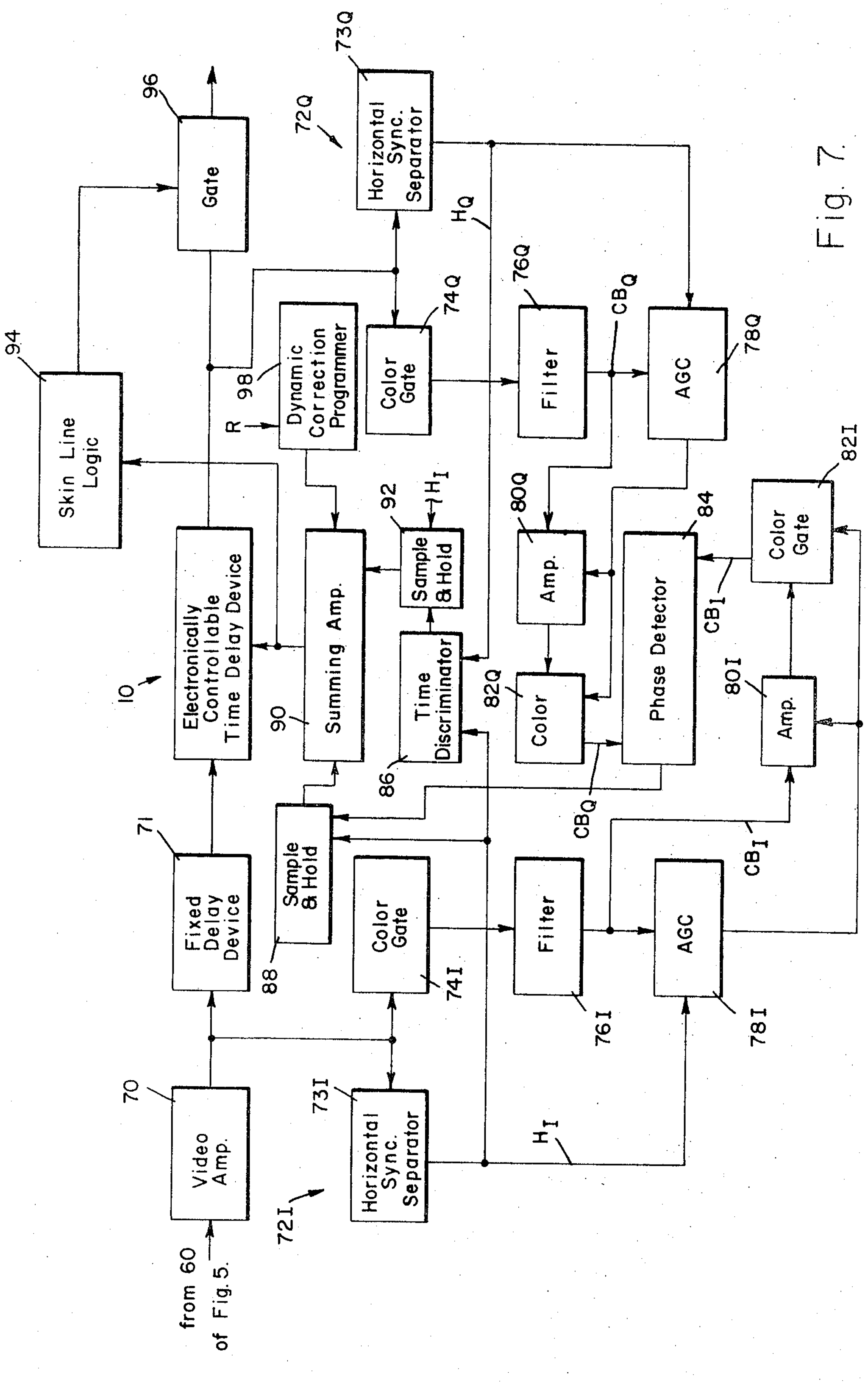
FIG. 7 is a block diagram of one preferred embodiment of a time base adapter unit.

One preferred embodiment of a time delay controller circuit in accordance with the subject invention is shown in detail in FIG. 7. However, prior to proceeding with a description of FIG. 7 electronically controllable time delay circuits which are particularly adapted for incorporation into the circuit of FIG. 7 will first be explained with reference to FIGS. 1 through 4.

Figure 1A:
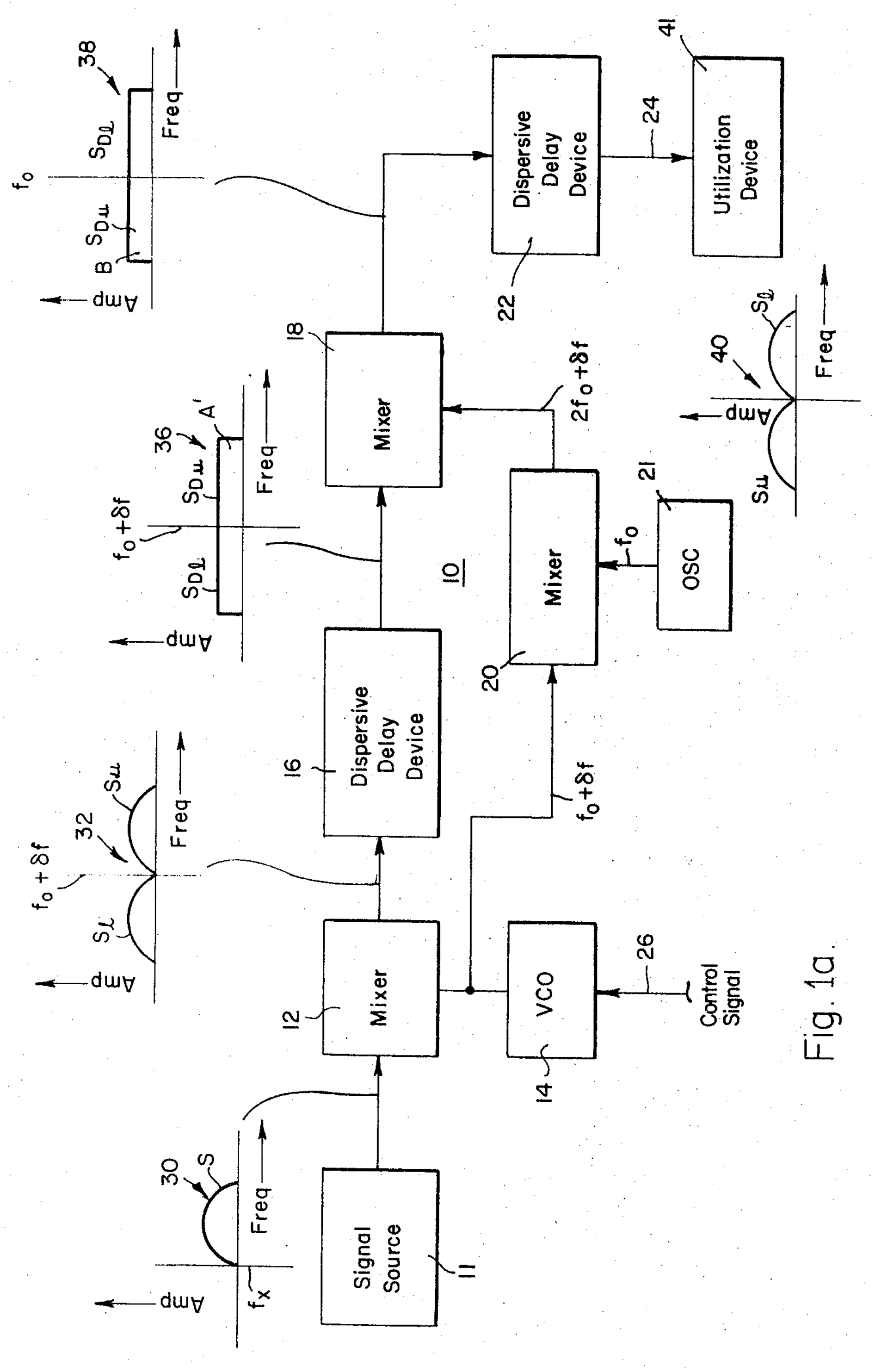
FIG. 1*a* is a block diagram of one preferred embodiment of an electronically controllable time delay device suitable for use in time delay controller circuits in accordance with the invention.

Reference is first primarily directed to FIG. 1*a* which shows one preferred embodiment of a variable time delay device adapted for use in time delay controller circuits in accordance with the subject invention. As there shown, a source 11 of broad bandwidth signals having a preselected base band (carrier) frequency $f_x$, is coupled to one input of a mixer 12. The other input of mixer 12 is supplied from a voltage controlled oscillator 14, and the output signal from mixer 12 is applied to a bandpass dispersive delay device 16. Dispersive delay devices apply differential values of time delay to signals of different frequencies. The output signal of delay device 16, appropriately shaped for single or double sideband transmission, is applied to one input of a mixer 18; and the other input signal thereto is supplied from a reference mixer 20. The output signal from mixer 18, at a frequency related to the difference in frequency between the input signals is applied through a second dispersive device 22 to an output lead 24. As will be explained subsequently, device 22 operates to time compress the previously dispersed applied signals.

The operation of the variable time delay device of FIG. 1*a* (indicated generally by reference numeral 10) may be better understood by reference to the waveforms shown in FIG. 1*a*. Waveform 30 illustrates the power amplitude versus frequency spectrum of the output signal from source 11. In order to simplify the explanation, this signal spectrum is considered to be referenced to a zero base band frequency ($f_x$) — i.e., a wideband video signal referenced to DC. The frequency of the output signal from voltage controlled oscillator (VCO) 14 is determined by a control signal applied to input terminal 26 thereof. The output frequency of voltage controlled oscillator 14 is designated $f_o + \delta f$, where $f_o$ may be considered the output frequency of the oscillator when the control signal is at a mean value; and $\delta f$ may be considered the deviation (positive or negative) from the mean value. The output signal from mixer 12 is shown in waveform 32 as having a carrier at $f_o + \delta f$ with upper and lower sidebands designated $S_u$ and $S_l$ respectively.

Figure 1B:
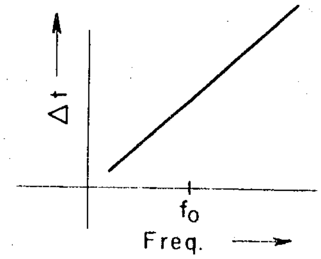
FIGS. 1*b* and 1*c* are graphs of time delay versus frequency and gain versus frequency characteristics, respectively, of dispersive delay devices of FIG. 1*a;*
Figure 1C:
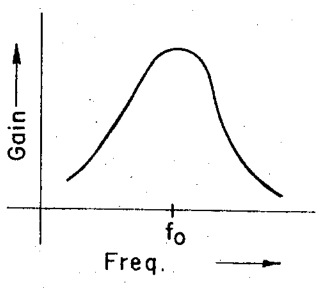

Dispersive delay device 16 may have a linear time delay versus frequency transfer function such as shown in FIG. 1*b*, with flat or shaped amplitude transmission characteristics. The center frequency of the operating range of device 16 may be selected to coincide with the mean frequency ($f_o$) of voltage control oscillator 14, such as 112 Mhz, for example. The central operating frequency and bandwidth of delay device 16 are selected to cover the desired time delay range; and therefore the corresponding frequency range.

The output signal from dispersive delay device 16 is shown in waveform 36 as having a generally rectangularly shaped amplitude versus frequency spectrum. However, the shape of the signal spectrum has been selected merely for illustrative purposes to indicate that the spectrum is changed by being processed through dispersive delay device 16.

The output signal spectrum from mixer 18 is depicted in a waveform 38 on FIG. 1*a;* and it is important to note that the mixer 18 not only translates the carrier frequency of the applied data signal from ($f_o + \delta f$) to $f_o$, but that the spectrum is inverted. The term "spectrum inversion" as used herein indicates that the position of the sidebands are reversed relative to the carrier, and that the spectral position of energy within each sideband is also reversed. For example, the signal at frequency B in waveform 38 was derived from energy at frequency A' in waveform 36. The second input signal to mixer 18 is supplied from mixer 20 at a frequency $2f_o + \delta_f$. Signals at frequencies $f_o + \delta f$ and $f_o$ are supplied to mixer 20 from VCO 14 and reference oscillator 21, respectively.

In the embodiment of FIG. 1*a*, dispersive delay device 22 (functional used to time compress previously dispersed signals) has the same time delay versus frequency characteristics, i.e., the same slope as delay device 16 (see FIG. 1*b*). Time compression is achieved within device 22 due to the spectrum inversion provided by mixer 18. The term time compression as used herein implies that the necessary time delay as a function of frequency is impressed upon a time dispersed signal spectrum to reproduce the original signal spectrum.

The spectrum of the output signal from dispersive delay device 22 is shown in waveform 40. Comparing the signal applied from source 11 to that produced at the output of delay device 22, it may be seen that the original spectrum is translated up to the carrier frequency $f_o$ and is duplicated in each one of a pair of spectral sidebands. Utilization device 41 may include circuits for translating the frequency of the output signal to any desired portion of the frequency domain; as well as eliminating a selected one of the sidebands, if desired (vestigial sideband transmission).

In the embodiment of FIG. 1a, the bandwidth of device 22 need not be as large as that of device 16 because the signals processed through delay device 22 are centered about a fixed carrier frequency ($f_o$). For example, the bandwidth of device 22 may be smaller than that of device 16 by an amount equal to the $\pm\delta f$ range of VCO 14 for double sideband operation, or less one sideband for vestigial sideband operation. Another advantage of the above described constant frequency implementation for dispersive delay device 22 is that amplitude weighting as a function of frequency may be readily implemented. For example, the transmission gain (less than one) of device 22 could have the Gaussian shaped characteristics shown in FIG. 1c. In certain applications amplitude weighting is required to reduce spectral sidelobes, which may at least in part be induced by the dispersion and compression processing.

To summarize, in the embodiment of FIG. 1a the variable time delay, i.e., the variable transit time through device 10, is predicated on dispersive coding, at an operating frequency selected for the desired delay, in a first dispersive delay line; followed by spectrum inversion, and time compression in a second dispersive delay line having the same time delay versus frequency slope as the first delay line. The second line may be operated at a fixed carrier frequency for ease in implementing amplitude weighting or vestigial sideband operation.

Figure 2B:
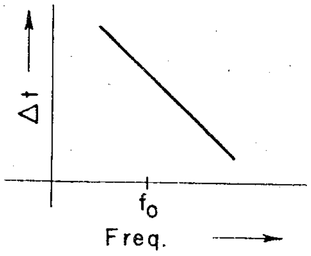
FIG. 2*b* is a graph of time delay versus frequency characteristics of one of the dispersive delay devices of FIG. 2*a;*
Figure 2A:
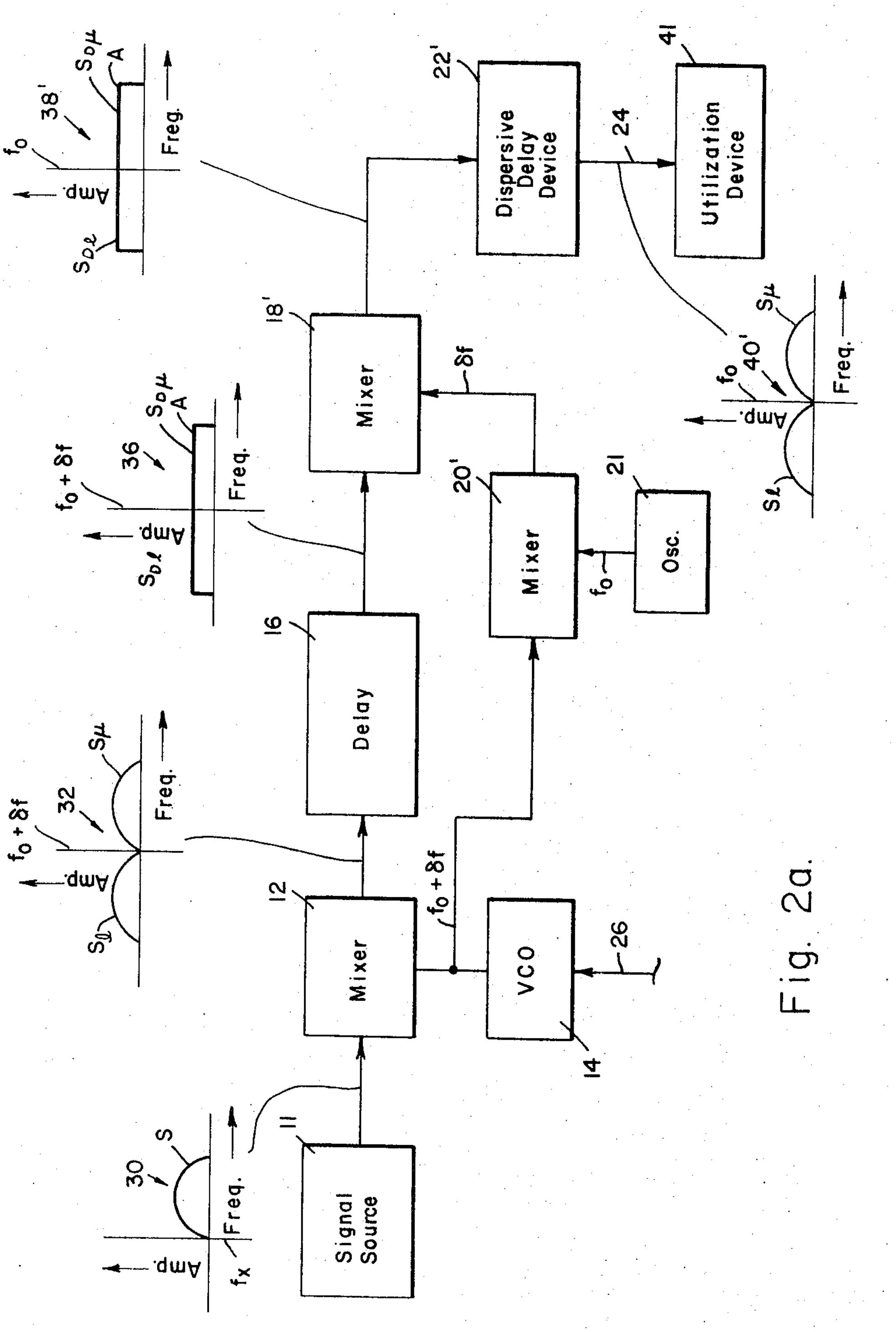
FIG. 2*a* is a block diagram of another preferred embodiment of an electronically controllable time delay device suitable for use in time delay controller circuits in accordance with the invention.

A second embodiment of an electronically variable time delay device is shown in FIG. 2*a*. Since the structure and operation of the device of FIG. 2*a* is similar to that of FIG. 1a only the differences between the two embodiments will be discussed. In FIG. 2a corresponding parts are designated by the same reference numeral as used in FIG. 1a, except that a change in the structure or function of a part in FIG. 2*a* is indicated by adding a prime superscript to the reference number. For example, in FIG. 2*a* the output section of mixer 20' is mechanized to pass the difference frequency $\delta f$, resulting from the mixing of the two input signals $f_o + \delta f$ and $f_o$. As a result of this mechanization of mixer 20', spectrum inversion is not performed within mixer 18' (see waveform 36 and 38'). Time compression of the output signals from mixer 18' is accomplished within dispersive delay line 22', which has a time delay versus frequency slope equal to the negative of the slope device 16. FIGS. 1*b* and 2*b* depicts the time delay versus frequency characteristics of delay device 16 and 22', respectively.

In the embodiment of FIG. 2*a*, mixer 18' performs frequency translation so that the output signals therefrom are always referenced to a preselected carrier frequency, e.g., $f_o$. As in the embodiment of FIG. 1*a*, this constant frequency operation of delay device 22' (FIG. 2) allows amplitude weighting to be readily implemented. However, in the embodiment of FIG. 2*a* it is necessary that the carrier frequency of the signal be changed (i.e., frequency translation be performed) to allow for the electronic control of the time delay therethrough; whereas this is not required for the embodiment of FIG. 1*a*.

FIG. 3*a* through 3*d* illustrates the operation of the devices of FIGS. 1*a* and 2*a* for the cases of four progressively higher carrier frequencies applied from mixer 12. As illustrated in FIG. 3, the time delay $T_{16}$ associated with the delay characteristic designated D-16, varies with the selected carrier frequency $f_o + \delta f$; while the delay T22 associated with the delay characteristics designated D-22, is constant. The delay characteristic designated D-16 corresponds to that imposed by the input section which included delay device 16; and the delay characteristic designated D-22 corresponds to that imposed by the output section which includes delay device 22.

Figures 3, 3A, 3B, 3C, 3D:
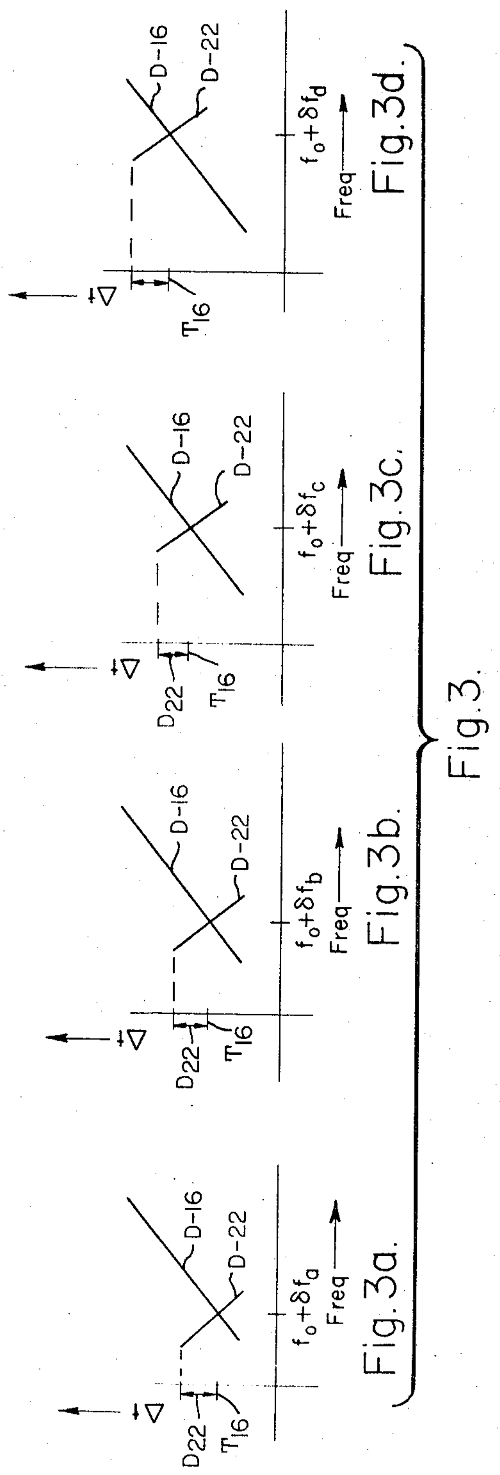
FIG. 3 depicts the relative time delay versus frequency characteristics of different sections of the device of FIGS. 1*a* and 2*a*, for explaining the operation thereof.

Also, it may be noted from FIG. 3 that not only may the time delay through the first delay device (16) be selectively varied as a function of the input carrier frequency, but the effective operating bandwidth of the device may also be controlled by selection of the input carrier frequency. For example, in FIG. 3 the operating bandwidth above the input carrier frequency in FIG. 3*d* is much less than in FIG. 3*a*. To phrase this last point in a slightly different manner, the value $\delta f$ determines where, within the operating range of the first dispersive delay device, the frequency dispersion takes place.

Dispersive delay devices suitable for elements 16 and 22 include dispersive surface wave delay lines. For example, in accordance with the invention, variable time delay devices capable of providing a controllable time delay of up to 50 microseconds have been implemented using dispersive surface wave delay lines operating at a mean center frequency of 112 Mhz with a bandwidth of 40 Mhz. Other embodiments of the invention using dispersive surface wave delay lines have been constructed for operating at 60 Mhz with a 20 Mhz bandwidth and they provide a variable time delay of up to 50 microseconds. The operation and construction of surface wave delay devices have been described in numerous articles such as:

"Surface Wave Device Applications and Component Developments," IEEE Journal of Solid-State Circuits, Vol. SC-5, Dec. 1970, by J. Burnsweig, E. H. Gregory, and R. J. Wagner; "Surface Wave Dispersion With a Time Bandwidth of 1,000," 1971 IEEE Solid State Circuits Conference, 18 Feb., Philadelphia, Pa., by J. Burnsweig and S. Arneson; "Surface Wave Filters," 1971 IEEE Conference on Systems, Networks and Computers, Jan. 21, 1971, Oaxtepec, Mexico, by J. Burnsweig, and S. Arneson;

"Surface Wave Device Applications and Component Developments," 1970 IEEE Solid State Circuits Conference, Feb. 19, Philadelphia, Pa., by J. Burnsweig, E. H. Gregory and R. J. Wagner; and "Direct Piezoelectric Coupling to Surface Elastic waves," Appl. Phy. Letters, Vol. 7, pp.314–316, Dec. 1965, by R. M. White and F. W. Voltmer.

Figure 4:
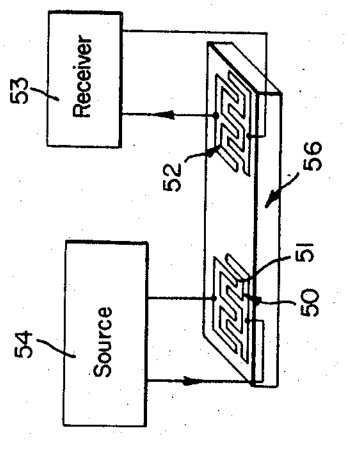
FIG. 4 is a top plan view of a dispersive surface wave delay line which may be used in the devices of FIGS. 1*a* and 2*a;*

Also a simplified sketch of a surface wave delay line is shown in FIG. 4 for the purpose of briefly summarizing the operation of such devices. Referring momentarily to FIG. 4, the surface wave delay device thereshown comprises deposited metal film, interdigital comb structures, photoetched onto a piezoelectric substrate 56. These interdigital structures form input and output transducers 50 and 52 respectively; and input transducer 50 is energized by a signal source 54. The input interdigital electrodes 51 have one-half wave length centers for some selected frequency and produce an elastic wave in the surface of the substrate material in response to the voltages from source 54; i.e., the electrodes produce fields which strain the material to cause the generation of a propagating elastic wave. This elastic wave produces electrical voltages in the interdigital structure of output transducer 52 thereby recreating at receiver 53 a delayed replica of the electrical signal applied to the input transducer. For wide bandwidth operation of the delay device, a great many interdigital finger grouping are used with each grouping being tuned to a particular portion of the applicable frequency spectrum. The dispersive effect is obtained by the different spacings between input and output transducer sections tuned to the different portions of the spectrum. For example, if the spacing between corresponding input and output transducer sections varies linearly as a function of frequency, linear frequency dispersion is provided. Also a fixed mean value of time delay is provided by the spacing on the substrate between the central portion of the input and output transducer assemblies.

A significant aspect of the subject invention relates to the removal of video distortions, such as those associated with the processing of color television (TV) programs and the like. For example, the recording and playback of TV data from multiple tape heads induces line to line time jitter, intra line distortion and field to field time base variations. Also, it is realized that the quality of TV pictures produced from recorded data, may be improved if one field of the recorded data is repeated a plurality of successive playback frames. One method for implementing this iteration process is to use data read by each of a plurality of displaced read heads. In this processing technique switching circuits apply the data from the respective read heads to the output circuits in a preselected sequence so that each recorded data frame is played back a desired number of times. However, it has been found that the time base jitter and signal distortion resulting from such tape playback exceeds the processing capability of conventional TV receivers. It is one of the objects of the subject invention to provide a universal time based error adapter unit sometimes hereinafter referred to as a time delay controller circuit suitable for reducing the signal distortion to values within the capability of conventional TV receivers. It is noted that the applicability of the time and phase reference correction provided by the subject invention are not restricted to those induced by the just described playback techniques. For example, the invention is equally applicable to the reduction of distortions related to the electromechanical interface of the recording heads with the tape, servo devices irregularities; and more conventional TV signal processing steps, such as station to station transmission via relay satellities, etc.

Figure 5:
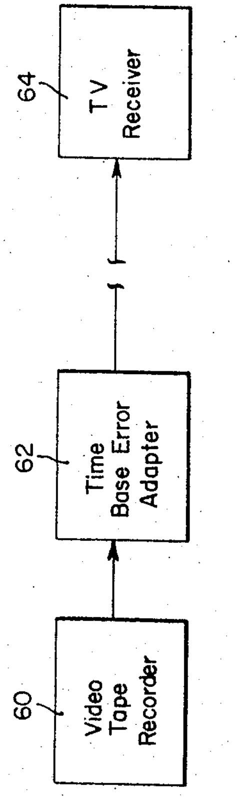
FIG. 5 is a block diagram of a video tape playback-television system incorporating a time base adapter unit in accordance with the invention.

FIG. 5 illustrates in block diagram form the overall concept of integrating a time base error adapter unit with magnetic or other electronic type recorder-playback devices so as to readjust the time and phase relationship of signals provided to a TV receiver. As shown in FIG. 5, the composite TV video or IF signal is applied from a video tape recorder-playback unit 60 to time base error adapter 62, wherein the time reference and color coding reference signals are readjusted to reduce distortions. The time and phase corrected output signal from adapter unit 62 is applied (by transmission or suitable leads) to TV receiver 64. The reduction in signal distortion within adapter unit 62 makes possible the above discussed iteration on the TV display of repetitive data fields (overlay), without blurring or line to line tearing due to time base errors associated with multiple read heads and/or other processing techniques.

Figure 6:
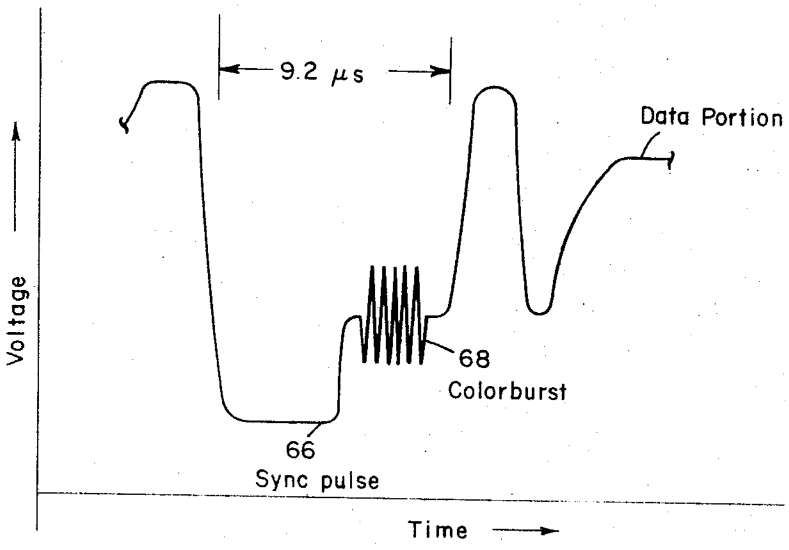
FIG. 6 is a waveform of a portion of a color television signal for explaining the purpose and function of the adapter unit.

A better understanding of time base error adapter 62 may be obtained by briefly examining the waveform of FIG. 6 which illustrates a portion of one horizontal line of color TV data. For a quality color TV picture, it is necessary that not only the timing between horizontal sync pulses 66 be maintained within predescribed limits, but that the phase as well as the frequency coherency of color burst signals 68 be maintained.

Tape recorders using the above-described multiple read head technique for picture iteration can have in excess of 0.25 microseconds of line-to-line time jitter due to head switching and due to the normal processing of data for storage on magnetic tape; and this amount of jitter exceeds the capability of conventional television receivers. For example, the automatic control characteristics of horizontal synchronizing circuits of conventional receivers are inadequate to operate with step changes of 0.25 microseconds of time jitter between heads without "horizontal line tearing." The time base error adapter unit 64 (FIG. 5) can reduce this time jitter between heads by an order of magnitude (to about 0.025 microseconds or 25 nanoseconds, for example) using a course error correction circuit operating as a function of the time separation between successive horizontal sync pulses. Additionally, the adapter may include fine error correction circuits which operate as a function of the phase coherency of successive horizontal color burst signals (reference frequency pulses) to reduce the time jitter by an additional order of magnitude, such as to a few nonoseconds, for example.

FIG. 7 is a block diagram of one preferred embodiment of the time base error adapter 62 of FIG. 5. Briefly, in the operation of unit 62 a control signal is applied to lead 26 of the variable time delay device 10 so as to adjust the delay through unit 10 as a function of the time variations between successive horizontal sync pulses to provide a course correction for time jitter in the applied video. Fine correction is provided by a comparison of the relative phase of the color burst signals (see 68 of FIG. 6) associated with successive horizontal lines.

In the circuit of FIG. 7, the TV type signals from tape recorder unit 60 (FIG. 5) are applied to an input video amplifier 70. The output signal from video amplifier 70 is applied through a fixed delay device 71 to the variable time delay device 10. The output signals from amplifier 70 are also applied to an input processing section indicated generally by reference numeral 72I. The mean value of the time delay of variable time delay device 10 is selected such that the total delay through units 71 and 10 is approximately equal to the time between successive horizontal sync pulses of the TV signals. Delay unit 71 will be discussed further subsequently but for now it may be assumed that the delay thereof is approximately 1 microseconds, and therefore the mean value of delay through device 10 is approximately 63 microseconds, for example. The output signal from variable time delay device 10 is applied to an output processing section indicated generally by the reference numeral 72Q.

Section 72I includes horizontal sync separator unit 73I, color gate circuit 74I, filter 76I, automatic gain control (AGC) unit 78I, amplifier 80I and color gate circuit 82I. Horizontal sync separator 73I operates to remove the horizontal sync pulses from the composite TV signal applied from the output terminals of amplifier 70; and color gate 74I and automatic gain control unit 78I are synchronized by the horizontal sync pulses so that they will be enabled during the color burst time period (see FIG. 6). Hence gate 74I as well as the input gates of AGC circuit 76I are synchronized by the leading edge of the horizontal sync pulse so that the color burst signal is processed through these units. The color burst signal, designated $CB_I$, from gate 74I is applied through bandpass filter 76I to signal input terminals of amplifier 80I and AGC unit 78I. The gain of amplifier 80I is controlled by the output signal from the AGC unit 78I such that the color burst signal at the output of amplifier 80I is maintained at a relatively constant amplitude. Color gate 82I, gates the signal applied thereto from amplifier 80I to one input terminal of a phase detector unit 84 only if the color burst signal exceeds a preselected value as determined by the output signal from AGC unit 78I. It is noted that gate 82I acts as a color "killer" circuit to inhibit signals to the phase detector 84 during horizontal lines in which the color burst signal is missing, such as during black and white programming, for example.

The structure and operation of output section 72Q is similar to that of the input section 72I described above; and units of section 72Q are designated by the same reference numeral used for corresponding units of section 72I except that the numeral is followed by the identifying letter Q. It is noted that the individual units comprising input sections 72I and 72Q may be conventional circuits of the type found in color television receivers.

Still referring primarily to FIG. 7, the output pulses from sync separators 73I and 73Q are compared in a time discriminator unit 86, to produce an output voltage indicative of the degree of time coincidence therebetween. The horizontal sync pulses from unit 73I are designated $H_I$ and the horizontal sync pulses supplied by unit 72Q are designated $H_Q$. Sample and hold circuit 92 is controlled by the $H_I$ signal and is mechanized such that the value of the output signal from time discriminator 86 is sampled and stored at some time $T_X$ following the leading edge of the $H_I$ signal. Time $T_X$ is the time required for time discriminator circuit 86 to stabilize within preselected limits, and it may be established at a time within the last 50 per cent of the horizontal sync pulses, for example.

The output signal from sample and hold circuit 92 is applied to a first input circuit of a summing amplifier 90. The signal produced by time discriminator 86 may be considered the course time jitter correction signal discussed hereinabove.

The phase detector 84 compares the relative phase of the color burst signals applied thereto from input section 72I and output section 72Q. The output signal from phase detector 84 is indicative of the phase coherency between the signals $CB_I$ and $CB_Q$. The color burst signal (see FIG. 6) may include about nine cycles of a 3.56 Mhz carrier. Sample and hold circuit 88 is synchronized by the leading edge of the $H_I$ signal and mechanized so that the value of the output circuit of the phase detector 84 is sampled and held at some time period $T_Y$ following the leading edge of the $H_I$ pulse. The time value $T_Y$ may be selected at a value which allows the output signal from the phase detector to have stabilized within preselected limits. For example, it may be established at a time corresponding to the last 50 per cent of the color burst pulse.

The output signal from sample and hold circuit 92 is applied to a second input circuit of summing amplifier 90, and the output signal from amplifier 90 is applied to input terminal 26 of variable time delay device 10. In response to this control signal from amplifier 90, device 10 varies its time delay so as to substantially reduce the time jitter in the signals processed therethrough.

The output error signal from amplifier 90 is also applied to a skip line logic circuit 94. Logic circuit 94 includes a threshold device for sensing when the value of the error signal exceeds a preselected value and for controlling gate 96 so that the gate is opened (signal flow interrupted) for the horizontal line data period following the time the threshold is exceeded. The purpose of skip line logic circuit 94 and gate 96 is to interrupt the TV signal for horizontal data lines during which the required value of correction exceeds the capability of the adapter unit of FIG. 7.

In addition to the time jitter of the type that varies more or less as a step function from one horizontal line to the next, there can be encountered cyclic type distortion such as produced by the rotation of a conical scan tape read head, for example. A significant aspect of the subject invention is its ability to reduce this type of distortion by programming, as a function of the characteristics of each cyclic error source, a correction voltage which is applied to variable time delay device 10. In FIG. 7 such a device is the dynamic correction programmer 98 which applies a time varying voltage to a third input terminal of summing amplifier 98 in accordance with a correction program for the dynamic distortion. For example, if unit 98 were to correct for cyclic errors introduced by each one of a plurality of tape read heads, then read control signals from tape unit 60 (FIG. 5) would be applied to the dynamic correction programmer unit 98 so that a voltage generator for each of the heads could be synchronized with the signals that control the coupling of the various read heads to the output of the video tape recorder unit 60. The synchronizing signals, indicated by R in FIG. 7 could be digitally coded pulses which identify the start of the readout from a particular head; and in response to this information the programmer 98 would apply a correction voltage to summing amplifier 98 according to a stored program. The correction voltage compensates for phase errors which are peculiar to the particular read head and which vary as a function of time, i.e., as a function of the position of the read head in its conical scan pattern, for example.

To summarize, it is sometimes desirable to process the television data so as to reduce the bandwidth required to store the data on magnetic tape; or to use techniques whereby the data from a particular picture frame is played back by a plurality of switchable read heads in such a manner that the same picture frame is successively displayed a plurality of times on the TV set. However, this type of processing introduces time jitter and/or signal distortion which exceeds the processing capability of conventional television receivers. Therefore it is desirable to provide a time base error adapter unit which may be coupled to the output of a commercial video tape recorder to reduce time jitter and signal distortion to values within the capability of conventional television sets. Hence, a relatively inexpensive video tape recorder/playback unit may be made compatible with conventional television sets within the need for modifications to the television receiver itself.

The time base error adapter circuit shown in FIG. 7 allows effective reduction in time jitter by techniques wherein the timing of horizontal sync pulses of two consecutive horizontal data lines are compared for coarse error monitoring and correction; and fine error correction is provided by phase monitoring the color burst signals of two consecutive horizontal data lines. Also means are provided for monitoring the value of the time jitter between successive horizontal data lines and for eliminating a horizontal line when the jitter value exceeds a preselected limit. When a horizontal line of data is blanked the resulting white (unmodulated) line on the television display is preferable to an unsynchronized or distorted presentation, as would be the case for large time errors without the skip lines function of unit 94 and 96. Additionally, cyclic type phase errors within a data line may be reduced by circuits for preprogamming the compensating phase corrections.

In the operation of the time base error adapter 62 of FIG. 7, the amplified TV video signal from amplifier 70 is applied to the input processing section 72I, and through delay device 71 to variable time delay unit 10. The delay value of unit 71 is such that the correction circuits will have time to sense the time error between horizontal sync pulses and between color burst signals, and to adjust the time delay of unit 10 prior to the time that the data signal is applied thereto. For example, the unit 71 may have a fixed delay of 1 microseconds for the illustrated embodiment. Within variable time delay unit 10, the signal carrier is translated upward to the frequency $f_0 + \delta f$ so as to provide the time delay correction as determined by the comparison of the horizontal sync pulses and the color burst signals within time discriminator 86 and phase detector 84, respectively.

Considering now the input processing section 72I, the output signal from amplifier 70 is divided into sync and color burst signals by means of typical base clipping, gating and filtering circuits. The horizontal sync pulses produced by both input processing section 72I and output processing section 72Q are time discriminated by unit 86 to produce a voltage indicative of the value of time jitter between successive horizontal data lines. Similarly the color burst signals from input section 72I and output section 72Q are obtained by time gating, filtering and AGC processing to provide amplitude stabilized signals for phase comparison in unit 84. The coarse time error correction signal from unit 86 and the phase error correction signal from unit 84 after being sampled and held by units 92 and 88, respectively, are combined to form the major portion of the correction signal to unit 10.

Thus a television signal is delayed in unit 10 by a control feedback circuit in such a manner as to correct timing and phase distortions. Also as discussed hereinabove relative to FIGS. 1*a* and 2*a*, time delay device 10 may incorporate amplitude weighting, i.e., varying the amplitude of the signals as a function of the frequency, so that time sidelobes may be reduced. This feature is important for minimizing or reducing the double image problem "ghosts" that time sidelobes can produce in television displays.

Thus there has been described a new and useful cost-effective time delay controller circuit adapted for reducing time jitter between successive signal groups, such as the output signals for multiple read head video tape playback systems, for example.

What is claimed is:

1. A time delay controller circuit for reducing time jitter between successive signal groups of the type wherein each group includes a synchronization pulse and a reference frequency pulse, said controller circuit comprising:

time delay means for imposing a time delay on signals processed therethrough as a function of a control signal applied thereto;

means for producing a first signal indicative of the time between the synchronization pulse of the input signal group to said time delay means, and the synchronization pulse of the output signal group from said time delay means;

means for producing a second signal indicative of the phase difference between the reference frequency pulse of the input signal group to said time delay means and the reference frequency pulse of the output signal group from said time delay means; and means for combining said first and second signals to form said control signal;

means for providing a logic signal when said control signal is less than a preselected value; and means responsive to said logic signal, for coupling the output of said time delay device to an output circuit only during time periods in which said control signal is less than said preselected value; whereby the time delay imposed on each signal group within said time delay means is controlled so as to reduce the time jitter between the signal groups.

2. The controller circuit of claim 1 further comprising means for receiving a third signal indicative of a dynamic time jitter function; and means for combining said third signal with said first and second signals to form said control signal.

3. The controller circuit of claim 2 wherein said time delay means comprises:

first delay means for time delaying signals processed therethrough in accordance with a first function of the frequency of the signals;

second delay means series coupled to said first delay means, for time delaying signals processed therethrough in accordance with a second function of the frequency of the signals with said second function being related to said first function such that signals at all frequencies are delayed substantially the same amount in transit through the combination of said first and second delay means; and a first frequency translation means for frequency translating the signals applied to at least one of said delay means as a function of the control signal; whereby the transit time through said time delay means is substantially the same for all frequencies and the magnitude of the transit time is determined by the value of the control signal.

4. The controller circuit of claim 1 wherein said time delay means comprises:

first delay means for time delaying signals processed therethrough in accordance with a first function of the frequency of the signals;

second delay means series coupled to said first delay means, for time delaying signals processed therethrough in accordance with a second function of the frequency of the signals with said second function being related to said first function such that signals at all frequencies are delayed substantially the same amount in transit through the combination of said first and second delay means; and a first frequency translation means for frequency translating the signals applied to at least one of said delay means as a function of the control signal; whereby the transit time through said time delay means is substantially the same for all frequencies and the magnitude of the transit time is determined by the value of the control signal.

5. A time delay controller circuit for reducing time jitter between successive signal groups of the type wherein each group includes a synchronization pulse and a reference frequency pulse, said controller circuit comprising:

time delay means for imposing a time delay on signals processed therethrough as a function of a control signal applied thereto;

means for producing a first signal indicative of the time between the synchronization pulse of the input signal group to said time delay means, and the synchronization pulse of the output signal group from said time delay means;

means for producing a second signal indicative of the phase difference between the reference frequency pulse of the input signal group to said time delay means and the reference frequency pulse of the output signal group from said time delay means;

means for receiving a third signal indicative of a dynamic time jitter function; and means for combining said first, second and third signals to form said control signal; whereby the time delay imposed on each signal group within said time delay means is controlled so as to reduce the time jitter between the signal groups.

6. A time delay controller circuit for reducing time jitter between successive signal groups of the type wherein each group includes a synchronization pulse and a reference frequency pulse, said controller circuit comprising:

time delay means for imposing a time delay on signals processed therethrough as a function of a control signal applied thereto; said delay means including first delay means for time delaying signals processed therethrough in accordance with a first function of the frequency of the signals, second delay means series coupled to said first delay means, for time delaying signals processed therethrough in accordance with a second function of the frequency of the signals with said second function being related to said first function such that signals at all frequencies are delayed substantially the same amount in transit through the combination of said first and second delay means, and a first frequency translation means for frequency translating the signals applied to at least one of said delay means as a function of the control signal, whereby the transit time through said time delay means is substantially the same for all frequencies and the magnitude of the transit time is determined by the value of the control signal;

means for producing a first signal indicative of the time between the synchronization pulse of the input signal group to said time delay means, and the synchronization pulse of the output signal group from said time delay means;

means for producing a second signal indicative of the phase difference between the reference frequency pulse of the input signal group to said time delay means and the reference frequency pulse of the output signal group from said time delay means; and means for combining said first and second signals to form said control signal; whereby the time delay imposed on each signal group within said time delay means is controlled so as to reduce the time jitter between the signal groups.

7. The controller circuit of claim 6 further comprising means for receiving a third signal indicative of a dynamic time jitter function; and means for combining said third signal with said first and second signals to form said control signal.

* * * * *